United States Patent [19]
Arnt

[11] Patent Number: 5,274,927
[45] Date of Patent: Jan. 4, 1994

[54] COMPASS APPARATUS
[75] Inventor: Stanley L. Arnt, Watervliet, Mich.
[73] Assignee: Michigan Outdoor Products, Inc., Watervliet, Mich.
[21] Appl. No.: 57,443
[22] Filed: May 4, 1993

Related U.S. Application Data
[63] Continuation-in-part of Ser. No. 972,160, Nov. 5, 1992, abandoned.
[51] Int. Cl.$^5$ .............................................. G01C 17/02
[52] U.S. Cl. ........................................ 33/352; 33/347; 33/334; 2/912; 124/88; 224/150; 224/901
[58] Field of Search ................. 33/352, 351, 333, 334, 33/347, 349, 350, 354, 265; 124/88; 2/DIG.; 368/281, 282, 283

[56] References Cited
U.S. PATENT DOCUMENTS

| | | | |
|---|---|---|---|
| 1,944,104 | 1/1934 | Niedermann | 33/349 |
| 2,653,390 | 9/1953 | White et al. | 33/334 |
| 3,041,917 | 7/1962 | Glatt . | |
| 3,304,555 | 2/1967 | Anderson et al. | 2/16 |
| 3,423,095 | 1/1969 | Cox | 2/16 |
| 3,660,907 | 5/1972 | Sutherland | 33/349 |
| 3,871,108 | 3/1975 | Beaudout | 33/349 |
| 3,888,500 | 6/1975 | Gauthier | 33/333 |
| 3,943,981 | 3/1976 | De Brabander | 2/DIG. 6 |
| 3,978,591 | 9/1976 | Jaaskelainen | 33/334 |
| 4,120,052 | 10/1978 | Butler | 2/16 |
| 4,140,253 | 2/1979 | Vickers et al. | 2/DIG. 6 |
| 5,079,846 | 1/1992 | Iden | 33/347 |

FOREIGN PATENT DOCUMENTS

| | | | |
|---|---|---|---|
| 2856698 | 7/1979 | Fed. Rep. of Germany | 33/333 |
| 21411 | of 1915 | United Kingdom | 33/349 |

Primary Examiner—William A. Cuchlinski, Jr.
Assistant Examiner—C. W. Fulton
Attorney, Agent, or Firm—Flynn, Thiel, Boutell & Tanis

[57] ABSTRACT

A combination of a compass and a connecting arrangement. The compass includes a compass housing having a base wall, a circular wall connected to and upstanding from the base wall and a transparent window connected to the circular wall to define a sealed chamber in which is located the compass works. The compass housing has a radially outwardly extending flange thereon which is greater in dimension than the outer diameter of the circular wall. The connecting arrangement includes a strap for securing the compass housing to an archer's bow. The strap includes an elongated, uniformly thin strip of material having oppositely facing surfaces. The strap has a centrally disposed, circular-shaped first hole therethrough, the diameter of the circular-shaped hole being less than the diameter of the aforesaid flange. The compass housing is received in the circular-shaped first hole, the flange abutting the second surface on the strap. A pair of uniformly thin patches of material straddle the strap, the first patch having a circular hole therein through which the circular wall of the compass housing extends. The first and second patches are secured together with the strap being oriented therebetween to secure the compass housing to the strap. A connecting structure is provided for connecting the second patch to the archer's bow whereas additional connecting structure is provided for securing the ends of the strap together enabling the strap to encircle the archer's bow to effect a securement of the compass housing to the aforesaid bow.

10 Claims, 2 Drawing Sheets

COMPASS APPARATUS

This application is a continuation-in-part of U.S. Ser. No. 07/972,160, filed Nov. 5, 1992 now abandoned.

FIELD OF THE INVENTION

This invention relates to a combination of a compass and a connective arrangement for facilitating a connection of the compass to a part of an archer's bow or any desired object.

BACKGROUND OF THE INVENTION

During hunting, a hunter usually moves about a terrain with which there is no familiarity. If the hunter is not careful, the hunter can easily become lost and not be able to make it back to the place whereat entrance into the terrain occurred. Accordingly, most hunters will use a compass to monitor the directions that they have travelled.

It is often desired to mount a compass onto a weapon, an example of a compass mounted on a rifle is illustrated in U.S. Pat. No. 2,653,390. However, mounting a compass onto a part of an archer's bow or rifle is somewhat problematic in that there is usually no structure conveniently available to which the compass can be mounted.

Accordingly, it is an object of this invention to provide a combination of a compass and a connective arrangement for facilitating a connection of the compass to a part of an archer's bow or any desired object.

It is a further object of the invention to provide a combination of a compass and a connective arrangement, as aforesaid, which will facilitate a mounting of a compass on the archer's bow or any desired object without necessitating the use of any tooling or a modifying of the structure of an archer's bow or the desired object. It is a further object of the invention to provide a combination of a compass and a connective arrangement, as aforesaid, which will be secure and will not inadvertently become released should the hunter move through underbrush and snag component parts of the connective arrangement onto the brush.

It is a further object of the invention to provide a combination of a compass and a connective arrangement, as aforesaid, which is of a weather tolerant construction.

SUMMARY OF THE INVENTION

The objects and purposes of the invention have been met by providing a combination of a compass which includes a compass works containing housing having a base wall, a circular wall connected to and upstanding from the base wall and a transparent window connected to the circular wall to define a sealed chamber in which is located the compass works which is visible through the transparent window. The compass works containing housing has a radially outwardly extending flange thereon which is greater in dimension than the outer diameter of the circular wall. A strap is provided for securing the compass works containing housing to a bow part on an archer's bow or any desired object. The strap includes an elongated, uniformly thin strip of material having oppositely facing surfaces. The strap has a centrally disposed, circular-shaped first hole therethrough, the diameter of the circular-shaped hole being less than the diameter of the aforesaid flange. The compass works containing housing is received in the circular-shaped first hole, the radially outwardly extending flange abutting the second surface on the strap. A pair of uniformly thin patches of material straddle the strap, the first patch having a circular hole therein through which the circular wall of the compass works containing housing extends. The first and second patches are secured together with the strap being oriented therebetween to secure the compass works containing housing to the strap. A connecting structure is provided for connecting the second patch to a bow part of the archer's bow or object whereas additional connecting structure is provided for securing the ends of the strap together enabling the strap to encircle the bow part of the archer's bow or object to effect a securement of the compass work containing housing to the aforesaid bow part or object.

BRIEF DESCRIPTION OF THE DRAWINGS

Other objects and purposes of the invention will become apparent to those of ordinary skill in the art upon reading the following specification with reference to the accompanying drawings, in which.

DETAILED DESCRIPTION

Figure 1:
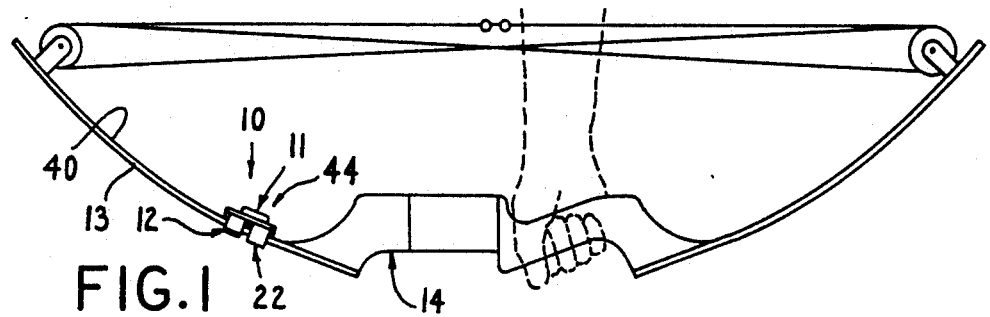
FIG. 1 is a side view of an archer's bow having the combination compass and connective arrangement embodying the invention mounted thereon.

FIG. 1 illustrates a combination 10 of a compass 11 and a connective arrangement 12 for securing the compass to a bow part 13 of an archer's bow 14.

Figure 4:
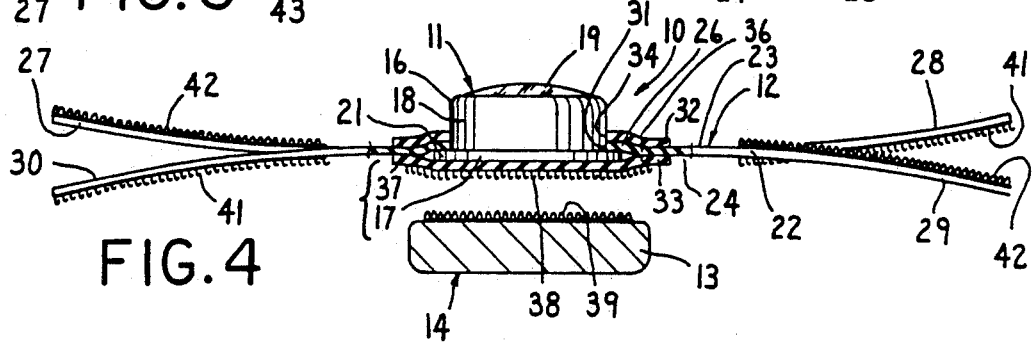
FIG. 4 is a side view of FIG. 2 partially sectioned to reveal the manner of securing the compass to the connective arrangement.

In this particular embodiment, the compass 11 includes a compass works containing housing 16 having a base wall 17, a circular wall 18 connected to and upstanding from the base wall and a transparent window 19 connected to the circular wall 18 to define a sealed chamber in which is located the compass works which is visible through the transparent window 19. The base wall 17 includes a radially outwardly extending flange 21 having a diameter that exceeds the outer diameter of the circular wall 18 as shown in FIG. 4.

The connective arrangement 12 includes an elongated strap 22 cut from a sheet of uniformly thin, planar elastically stretchable and flexible material, such as rubber. The strap 22 has oppositely facing surfaces 23 and 24 thereon. The strap 22 is generally H-shaped having a central portion 26 and four generally parallel legs 27, 28, 29 and 30. The central portion 26 has a centrally disposed, circular-shaped hole 31 therethrough, the diameter of the hole 31 being about the same diameter as the outer surface of the circular wall 18, but less than the outer dimension of the flange 21. The compass works containing housing 16 is received in the hole 31 with the upper surface (FIG. 4) of the flange 21 engaging the surface 24 The radially inwardly facing edge of the circular shaped hole in the central portion opposes the outer surface of the circular wall 18.

Upper and lower patches 32 and 33 of material straddle the strap 22. The patches of material 32 can be made of a material that is different than the strap 22. However, in this particular embodiment, the patches 32 and 33 are made of the same material as is the strap 22. The upper patch 32 has a central hole 34 therein of a diameter that is generally equal to the outer diameter of the circular wall 18 and receives therein the circular wall 18 of the housing 16. The lower patch 33 does not have any hole in it. The patches 32 and 33 are preferably of the same size and are vertically aligned with one another and sewn together with the strap 22 being oriented therebetween. The seam of the sewed together connection is schematically illustrated as at 36 in FIGS. 2 and 4.

The bottom surface 37 of the lower patch 33 has secured thereto a first part 38 of a two part connecting structure whereas the bow part 13 (FIG. 4) of the archer's bow 14 has the second part 39 secured thereto. In this particular embodiment, the two parts 38 and 39 face one another as shown in FIG. 4. The two parts of the connective arrangement 38, 39 are of a Velcro-like construction wherein one part consists of a plurality of hook-like members and the other part contains a plurality of loops with which the hooks engage when the two parts are connected together. As is illustrated in FIG. 1, the part 39 of the connective arrangement is provided on a surface 40 of the bow part 13 that faces the bow string. Thus, when the archer is carrying the bow, the archer's hand will be generally in the position depicted in broken lines in FIG. 1 with the compass 11 being readily visible by the archer.

Each of the legs 27-30 includes the same type of two part connective structure as discussed above for facilitating a coupling of the legs 27 and 28 together as well as the legs 29 and 30 together. That is, the leg 27 will have secured thereto a first part 41 of a two part connective arrangement whereas the leg 28 has the second part 42 secured thereto. The same is true with respect to the legs 29 and 30. In this particular embodiment, the two part connections 41, 42 are of a Velcro-like construction wherein one part comprises a plurality of hooks and the other mating part comprises a plurality of loops with which the hooks become engaged. In order to effect a connection of the legs to one another, it will be noted that the legs wrap around the bow part 13 with the leg 28 lying on the outside of the leg 27 and the leg 30 lying outside of the leg 29. This connective relationship will generally prevent both of the connective legs 27, 28 and 29, 30 becoming simultaneously unconnected should the bow part 13 become entangled in brush or the like during hunting. That is, if one of the two sets of legs becomes uncoupled due to entanglement with brush, it is unlikely that the second set of legs 29 and 30 will become uncoupled due to the opposite manner in which the legs overlap one another.

In this particular embodiment, the Velcro-like material of the two parts 41 and 42 can be sewn to the strap 22 as schematically illustrated at 43 representing the seam of the sewn together connection. The seam 36 can be utilized for securing the part 38 of the two part connection 38, 39 to the surface 37 of the patch 33. When the connective arrangement 12 has effected a connection of the compass 11 to the bow part 13, the compass works 44 will be visible through the transparent window 19.

Figure 2:
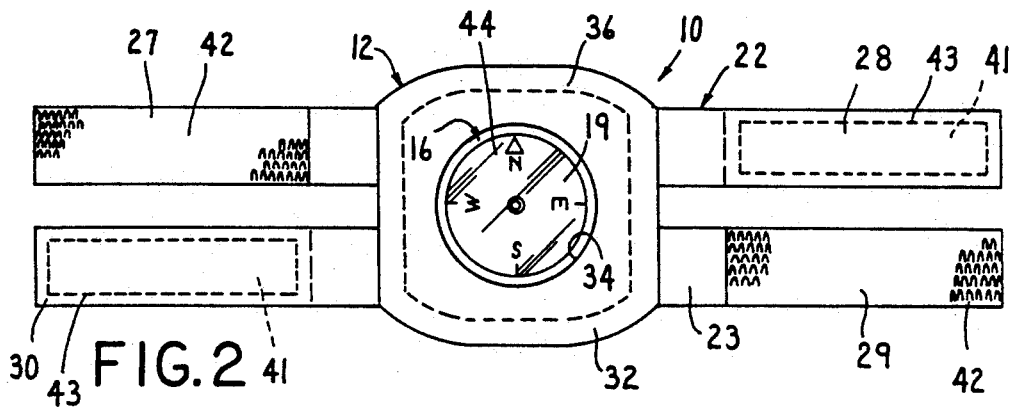
FIG. 2 is an enlarged front view of the compass and connective arrangement.
Figure 3:
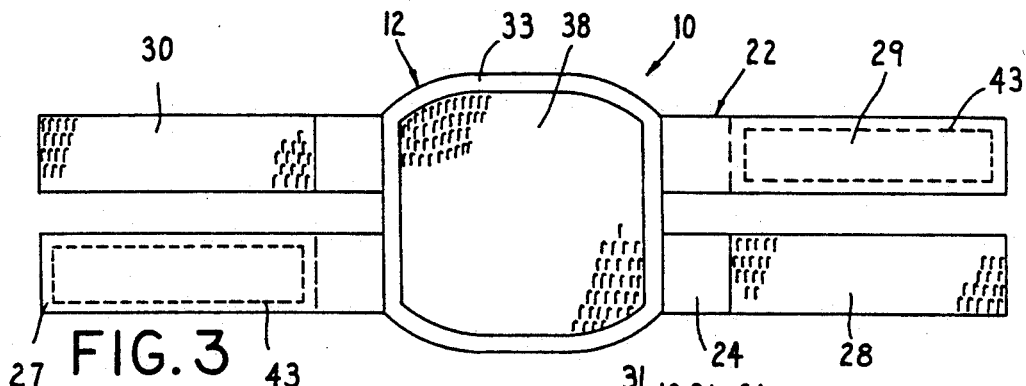
FIG. 3 is a rear view of FIG. 2.
Figure 5:
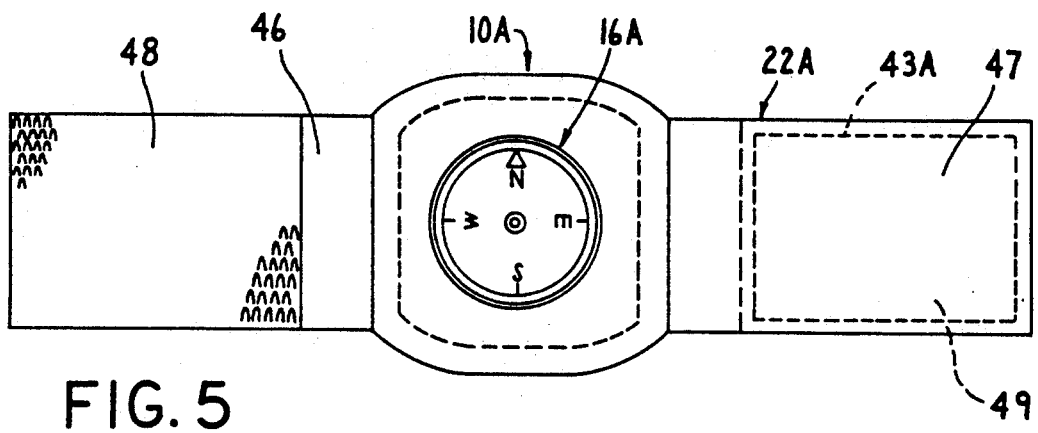
FIG. 5 is a front view of an alternate embodiment.

The illustration of FIG. 5 is similar to FIG. 2. Accordingly, the same reference numbers used above to describe FIG. 2 will be used below to describe the alternate embodiment of FIG. 5, except that the suffix "A" will be added to the appropriate reference number in FIG. 5.

The only difference between the embodiment 10 of FIG. 2 and the embodiment 10A of FIG. 5 is that the strap 22A of the embodiment 10A of FIG. 5 is not formed into an H-shape having generally four legs comparable to the legs 27-30. Instead, the legs 27, 30 and 28, 29 in FIG. 2 are united to form a single leg 46 and 47, respectively, on each side of the compass works containing housing 16A. I have discovered that the surface area of the legs 46 and 47 and the Velcro-like material 48 and 49 sewn as at 43A to each leg is sufficient to provide a secure fastening of the device 10A to the desired object. All other structures of the device 10A of FIG. 5 are identical to the device 10 shown in FIG. 2.

Figure 6:
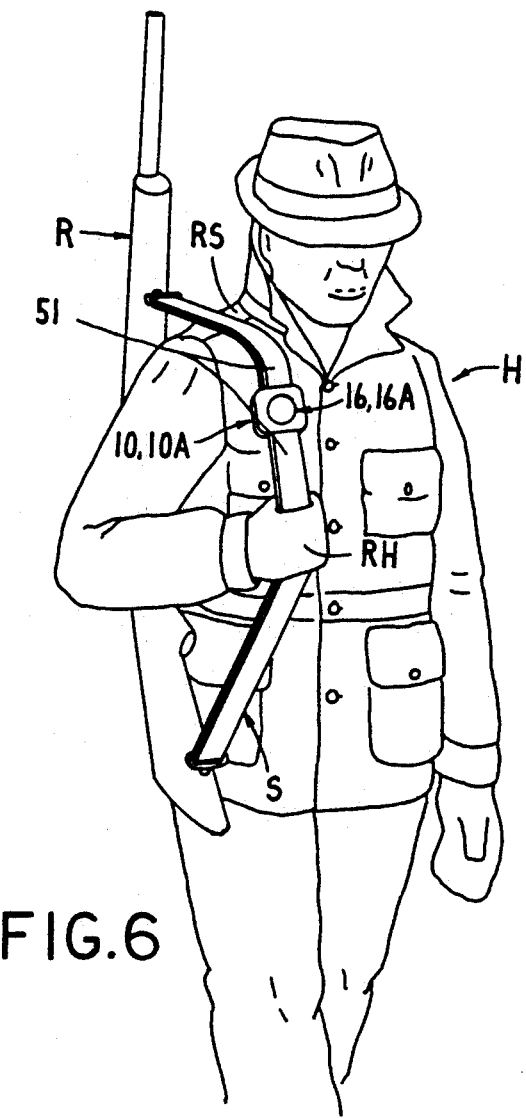
FIG. 6 illustrates a further alternate use of the inventive combination.

FIG. 6 illustrates the inventive device secured to the shoulder support strap S on a hunter's rifle R. Thus, all that the hunter H needs to do in order to read the compass 16, 16A is to hold the shoulder strap S horizontal, usually by simply lifting the right hand RH so that the shoulder strap segment 51 extends horizontally frontwardly from the right shoulder RS.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A combination of a compass and a connecting arrangement, said compass including a compass works containing housing having a base wall, a circular wall connected to and upstanding from said base wall and a transparent window connected to said circular wall to define a sealed chamber in which is located the compass works which is visible through the transparent window, said housing having a radially outwardly extending flange means having an outer first diameter greater than an outer second diameter of said circular wall, said connecting arrangement including a strap means for securing said compass works containing housing to a bow part on an archer's bow, said strap means comprising an elongated, uniformly thin, planar strip of material having oppositely facing first and second surfaces and means defining a centrally disposed first hole through the strip of a third diameter less than said first diameter of said flange means, said compass works containing housing being received in said hole so that a radially inwardly facing edge of said first hole opposes said circular wall, said radially outwardly extending flange means abutting said second surface, first and second uniformly thin, planar patches of material oriented in planes parallel to a plane containing said strip and straddling said strip, said first patch having means defining a centrally disposed second hole therethrough of a fourth diameter generally equal to said second diameter of said circular wall, said compass works containing housing being received in said second hole, said first patch engaging said first surface of said strip, said second patch engaging said second surface of said strip and base wall, said flange means being oriented between said second surface and said second patch, connecting means interconnecting said first and second patches to said strip, opposite longitudinal ends of said strip having coupling means thereon to enable said ends to be coupled together thereby encircling the bow part on said archer's bow.

2. The combination according to claim 1, wherein said strip has an H-shape consisting of two sets of two parallel legs connected by a central portion, said first hole being provided in said central portion, said first and second patches being secured to opposite sides of said central portion by said connecting means, said two sets of two parallel legs being longitudinally aligned so that a leg of each set can be coupled together by said coupling means.

3. The combination according to claim 2, wherein said coupling means includes a Velcro-like material consisting of mating first and second parts, said first part being secured to one of said first and second surfaces of a first leg in each set and said second part being secured to an other of said first and second surfaces of a second leg in each set, said first leg in one set being connected to said second leg in the other set by said mating first and second parts.

4. The combination according to claim 1, wherein said strip is made of an elastically stretchable and flexible sheet material.

5. The combination according to claim 4, wherein said elastically stretchable and flexible sheet material is a rubber compound.

6. The combination according to claim 1, wherein said second patch is secured to said bow part of said archer's bow by means of a Velcro-like material consisting of first and second mating parts, said first part being secured to an outwardly facing surface of said second patch and said second part being secured to said bow part of said archer's bow.

7. A combination of a compass and a connecting arrangement, said compass including a compass works containing housing having a base wall, a circular wall connected to and upstanding from said base wall and a transparent window connected to said circular wall to define a sealed chamber in which is located the compass works which is visible through the transparent window, said housing having a radially outwardly extending flange means having an outer first diameter greater than an outer second diameter of said circular wall, said connecting arrangement including a strap means for securing said compass works containing housing to a desired support therefor, said strap means comprising an elongated, uniformly thin, planar strip of material having oppositely facing first and second surfaces and means defining a centrally disposed first hole through the strip of a third diameter less than said first diameter of said flange means, said compass works containing housing being received in said hole so that a radially inwardly facing edge of said first hole opposes said circular wall, said radially outwardly extending flange means abutting said second surface, first and second uniformly thin, planar patches of material oriented in planes parallel to plane containing said strip and straddling said strip, said first patch having means defining a centrally disposed second hole therethrough of a fourth diameter generally equal to said second diameter of said circular wall, said compass works containing housing being received in said second hole, said first patch engaging said second surface of said strip and base wall, said flange means being oriented between said second surface and said second patch, connecting means interconnecting said first and second patches to said strip, opposite longitudinal ends of said strip having coupling means thereon to enable said ends to be coupled together thereby encircling the desired support.

8. The combination according to claim 7, wherein said second patch is secured to said desired object by means of a Velco-like material consisting of first and second mating parts, said first part being secured to an outwardly facing surface of said second patch and said second part being secured to said desired object.

9. The combination according to claim 7, wherein said strip is made of an elastically stretchable and flexible sheet material.

10. The combination according to claim 7, wherein said elastically stretchable and flexible sheet material is a rubber compound.

* * * * *

UNITED STATES PATENT AND TRADEMARK OFFICE
CERTIFICATE OF CORRECTION

PATENT NO. : 5 274 927
DATED : January 4, 1994
INVENTOR(S) : Stanley L. Arnt It is certified that error appears in the above-identified patent and that said Letters Patent is hereby corrected as shown below:

Column 6, line 16; after "to" insert ---a---.
          line 22; after "said" (first occurrence) insert
                  ---first surface of said strip, said
                      second patch engaging said---.

Signed and Sealed this

Twenty-eighth Day of June, 1994

*Attest:*

BRUCE LEHMAN

*Attesting Officer*     Commissioner of Patents and Trademarks